United States Patent [19]

Haese et al.

[11] Patent Number: 5,408,027

[45] Date of Patent: Apr. 18, 1995

[54] PROCESS FOR THE PRODUCTION OF ALIPHATIC-AROMATIC POLYCARBONATES

[75] Inventors: Wilfried Haese, Odenthal; Ralf Pakull, Köln; Gerhard Fennhoff, Willich; Jürgen Kirsch, Leverkusen, all of Germany

[73] Assignee: Bayer Aktiengesellschaft, Leverkusen, Germany

[21] Appl. No.: 201,438

[22] Filed: Feb. 24, 1994

[30] Foreign Application Priority Data

Mar. 5, 1993 [DE] Germany .................. 43 06 961.4

[51] Int. Cl.6 .......................................... C08G 64/00
[52] U.S. Cl. ......................... 528/196; 528/199; 528/272
[58] Field of Search .................. 528/196, 199, 272

[56] References Cited

U.S. PATENT DOCUMENTS

| | | | |
|---|---|---|---|
| 3,030,331 | 4/1962 | Goldberg | 528/182 |
| 3,169,121 | 2/1965 | Goldberg | 528/173 |
| 3,220,976 | 11/1965 | Goldberg | 528/148 |
| 3,553,167 | 1/1971 | Schnell et al. | 528/148 |
| 4,130,548 | 12/1978 | Kochanowski | 528/197 |
| 4,169,868 | 10/1979 | Schreckenberg et al. | 525/439 |
| 4,196,276 | 4/1980 | Schreckenberg et al. | 528/176 |
| 4,286,083 | 8/1981 | Kochanowski | 528/173 |
| 4,841,009 | 6/1989 | Kelsey | 528/75 |
| 4,983,706 | 1/1991 | Fontana et al. | 528/176 |
| 5,011,967 | 4/1991 | Silva et al. | 558/281 |
| 5,015,720 | 5/1991 | Boden et al. | 528/179 |
| 5,025,081 | 6/1991 | Fontana et al. | 528/176 |

FOREIGN PATENT DOCUMENTS

| | | |
|---|---|---|
| 433716 | 6/1991 | European Pat. Off. . |
| 1177517 | 4/1959 | France . |
| 1212983 | 3/1966 | Germany . |
| 1420475 | 10/1968 | Germany . |
| 1420476 | 10/1968 | Germany . |
| 1495906 | 5/1969 | Germany . |
| 1495912 | 5/1969 | Germany . |
| 3333864 | 4/1985 | Germany . |
| 730599 | 5/1955 | United Kingdom . |
| 9109896 | 7/1991 | WIPO . |

OTHER PUBLICATIONS

"Chemistry and Physics of Polycarbonates" 1964, pp. 58 to 60.

*Primary Examiner*—John Kight, III
*Assistant Examiner*—Terressa M. Mosley
*Attorney, Agent, or Firm*—Joseph C. Gil; Aron Preis

[57] ABSTRACT

A process for producing an aliphatic-aromatic polycarbonate is disclosed. The process comprise (A) reacting in an anhydrous neutral solvent (i) an oligocarbonate of diphenol with (ii) an aliphatic dicarboxylic acid, and (B) eliminating the hydrogen chloride and carbon dioxide by-products. The oligocarbonate of diphenol is characterized in that it is terminated by chlorocarbonic acid ester groups. The resins thus prepared are readily molded conventionally.

9 Claims, No Drawings

PROCESS FOR THE PRODUCTION OF ALIPHATIC-AROMATIC POLYCARBONATES

This invention relates to a process for the production of aliphatic-aromatic polycarbonates in anhydrous solution, characterized in that oligocarbonates of diphenols terminated by chlorocarbonic acid ester groups are reacted with aliphatic dicarboxylic acids in anhydrous neutral solvents, optionally in the presence of catalysts, with elimination of hydrogen chloride and carbon dioxide.

The molar ratio of oligocarbonate to dicarboxylic acid is preferably stoichiometric, i.e. one carboxylic acid group is reacted for every chlorocarbonic acid ester group.

Monophenols or monocarboxylic acids may optionally be used as chain terminators in quantities of 0.5 mol-% to 10 mol-% and preferably in quantities of 1.5 mol-% to 8 mol-%, based on the sum of carbonate and ester groups.

In addition, where chain terminators are used, the branching agents normally used for aromatic polycarbonates, i.e. in particular triphenols, tetraphenols, etc, may be used in quantities of 0.05 mol-% to 2 mol-%, based on the sum total of carbonate and ester groups.

Other suitable branching agents are tris- or tetracarboxylic acids.

The use of branching agents in the absence of chain terminators results in crosslinked products which are undesirable in the present context.

In addition, the present invention relates to the aliphatic-aromatic polycarbonates obtainable by the process according to the invention.

PRIOR ART

The reaction of chlorocarbonic acid esters of monohydroxy or polyhydroxy compounds with carboxylic acids is known from GB-PS 730,599. Aliphatic dicarboxylic acids, such as adipic acid, are also suitable as the carboxylic acids. Phenols are also suitable as the polyhydroxy compounds (see page 1, lines 60 to 64 of GB-PS 730,599).

Example 6 describes the reaction of adipic acid with bis-chlorocarbonic acid esters of butane-1,4-diol to polyesters. Oligocarbonates of diphenols terminated by chlorocarbonic acid ester groups are not mentioned.

The production of thermoplastic esters from diphenols and dicarboxylic acids is known from FR-PS 1 177 517, the halides of the dicarboxylic acids being used. Phosgene may also be used (see the Resumé of FR-PS 1 177 517). The acid halide may be added first followed by the phosgene or vice versa (page 2, right-hand column, second paragraph). In Examples 8 and 9, phosgene and acid halide are added at the same time.

DE-OS 1 420 476 describes a process for the production of block mixed polyesters in which the haloformate of a hydroxy compound is reacted with a carboxylic acid (see page 4, lines 7 to 9 of the DE-OS). The reaction is carried out in an organic solvent which, in excess, contains 1 mol equivalent of a tertiary amine for every mol equivalent of the haloformate (page 4, lines 11 to 13 of the DE-OS). The unfavorable aspect of this process is that the amine or its hydrochloride has to be completely removed from the polymer formed and that the amine has to be recovered for economic reasons. In addition, any amine or hydrochloride remaining in the polymer adversely affects its properties and seriously restricts its applications (see also U.S. Pat. No. 3,030,331).

DE-OS 1 495 912 describes the simultaneous reaction of diphenol, diacid and phosgene for the production of linear mixed polyesters by reaction in anhydrous solution using excess amine. The disadvantage of this process is that the amine or its hydrochloride has to be completely removed from the polymer formed and that the amine has to be recovered for economic reasons. In addition, any amine or hydrochloride remaining in the polymer adversely affects its properties and seriously restricts its applications.

U.S. Pat. No. 3,220,976 describes the reaction of bis-chlorocarbonic acid esters of diphenols with dicarboxylic acids, such as adipic acid, in anhydrous solvents, the solvent containing tertiary amines or consisting entirely of tertiary amines (column 3, lines 45 to 61 of U.S. Pat. No. 3,220,976). According to U.S. Pat. No. 3,220,976, column 4, lines 3 to 8, block copolyesters can also be produced (see also Example 21 of the US patent). The disadvantage of this process is that the amine or its hydrochloride has to be completely removed from the polymer formed and that the amine has to be recovered for economic reasons. In addition, any amine or hydrochloride remaining in the polymer adversely affects its properties and seriously restricts its applications.

DE-OS 1 420 475 and U.S. Pat. No. 3,169,121 describe the production of polycarbonates containing ester groups in pyridine as solvent. To this end, dicarboxylic acid or dicarboxylic acid chlorides are reacted with an aromatic diphenol and phosgene. Incorporation proceeds via the reaction of the dicarboxylic acid (di)-chloride with the aromatic diphenol. In the process according to the invention, the dicarboxylic acid is not converted into the dicarboxylic acid (di)chloride by phosgene. The disadvantage of this process is that the pyridine or its hydrochloride has to be completely removed from the polymer formed and that the pyridine has to be recovered for economic reasons. In addition, any pyridine or hydrochloride remaining in the polymer adversely affects its properties and seriously restricts its applications.

U.S. Pat. No. 3,553,167 describes the incorporation of aliphatic dicarboxylic acids by way of the reaction with aromatic diol and diaryl carbonate in the melt. However, the products are distinctly colored through prolonged exposure to heat during their production, so that their use is seriously restricted.

DE-OS 1 495 906 and U.S. Pat. No. 3,290,409 describe a process for the production of polycarbonates using a suspended inorganic base which is said to neutralize the hydrochloric acid formed during the reaction. In this process, the conduct of the reaction involves technical complications and difficulties and, hitherto, has not been successful from the economic point of view.

In "Chemistry and Physics of Polycarbonates" 1964, pages 58 to 60, Schnell describes processes for the production of polycarbonates containing ester structures by reactions in anhydrous solvents, the solvent containing or consisting entirely of tertiary amines, by the interfacial method according to FR-PS 1 177 517 and by melt processes.

DE-OS 2 636 783 (Le A 16 689), DE-OS 2 702 626 and U.S. Pat. No. 4,196,276 and 4,169,868 describe the incorporation of polymer segments, for example polyester segments having molecular weights above 600. At the same time, they disclose that dicarboxylic acids having a molecular weight below 600 cannot be satisfactorily co-condensed by the interfacial method.

U.S. Pat. No. 4,286,083 describes the production of copolyesters containing both carboxylic acid and carbonate groups which have been produced from a carbonic acid halide, a dicarboxylic acid and a dihydroxy compound by the interfacial method.

DE-OS 2 758 030, EP 433 716, 439 829 and 460 206, WO 91/09896 and U.S. Pat. No. 4,130,548, 4,983,706 and 5,025,081 describe the incorporation of long-chain dicarboxylic acids in modified interfacial methods where the pH value has to be strictly controlled. All these processes are limited in regard to the use of certain dicarboxylic acids, i.e. particularly long-chain dicarboxylic acids, and the incorporable content and are critical in regard to the formation of aliphatic anhydride groups which can be formed from the reaction between aliphatic acid and phosgene. These groups reduce the thermal stability of the products which is a particular disadvantage so far as their processing is concerned. The process according to the invention does not use phosgene, so that no aliphatic anhydride groups can be formed.

EP 460 460 and U.S. Pat. No. 5,015,720 describe a process for the production of polycarbonates containing aliphatic ester structures in which a preliminary product is first produced by reaction of a dihydroxy compound with an aliphatic dicarboxylic anhydride and is subsequently reacted with phosgene by the interfacial method. This process is limited to only a few readily accessible aliphatic carboxylic anhydrides and is attended by the same pH problems as the processes described above.

By contrast, it was surprising to find that the process according to the invention for the production of aliphatic-aromatic polycarbonates in anhydrous solution, which is characterized in that oligocarbonates of diphenols terminated by chlorocarbonic acid ester groups are reacted with aliphatic dicarboxylic acids in anhydrous neutral solvents, optionally in the presence of catalysts, with elimination of hydrogen chloride and carbon dioxide, leads to high yields of high-quality aliphatic-aromatic polycarbonates.

The bischlorocarbonic acid esters of aromatic oligocarbonates to be used in accordance with the invention are known from the literature (see, for example, DE-AS 1 212 983) or may be obtained by methods known from the literature (see, for example, EP 263 432). They preferably correspond to formula (I):

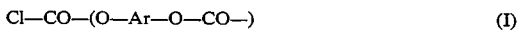

Cl—CO—(O—Ar—O—CO—)     (I)

in which n is the mean value of a distribution and has a value of 4 to 20, preferably 5 to 10 and, more preferably, 6 to 8 and in which —Ar—O— is a diphenolate residue containing 6 to 30 carbon atoms which may be mononuclear or polynuclear and, where it is polynuclear, may be linked by bridge members, such as for example alkylene groups, alkylidene groups, cycloalkylidene groups, —CO—, sulfide, oxide or sulfone, or by a single bond and may be alkyl—, chlorine—or bromine-substituted. Preferred diphenols HO—Ar—OH     (II)

are those corresponding to formula (III):

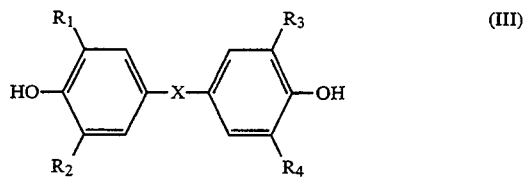

in which X is a $C_{1-18}$ alkylene, a $C_{2-8}$ alkylidene, a $C_{5-10}$ cycloalkylidene, —S— and a single bond and in which $R_1$ to $R_4$ may be the same or different and represent $CH_3$, Br or H.

Diphenols may be, for example, hydroquinone, resorcinol, dihydroxydiphenyls, bis-(hydroxyphenyl)alkanes, bis-(hydroxyphenyl)-cycloalkanes, bis-(hydroxyphenyl)-sulfides, bis-(hydroxyphenyl)-ethers, bis-hydroxyphenyl ketones, bis-(hydroxyphenyl)-sulfones, α'-bis-(hydroxyphenyl)-diisopropylbenzenes and nucleus-alkylated and nucleus-halogenated compounds thereof.

Preferred diphenols are, for example, 4,4'dihydroxydiphenyl, 2,2-bis-(4-hydroxyphenyl)-propane, 2,4-bis-(4-hydroxyphenyl)-2-methylbutane, 2,2-bis-(3-methyl-4-hydroxyphenyl)-propane, 2,2-bis-(3-chloro-4-hydroxyphenyl)-propane, bis-(3,3-dimethyl-4-hydroxyphenyl)-methane, 2,2-bis-(3,5-dimethyl-4-hydroxyphenyl)propane, 2,4-bis-(3,5-dimethyl-4-hydroxyphenyl)-2-methyl butane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-3,3,5-trimethyl cyclohexane and 1,1-bis-(4-hydroxyphenyl)-cyclohexane.

Particularly preferred diphenols are, for example, 2,2-bis-(4-hydroxyphenyl)-propane, 2,2-bis-(3,5-dimethyl-4-hydroxyphenyl)-propane, 2,2 -bis- ( 3,5-dichloro-4-hydroxyphenyl)-propane, 2,2-bis- (3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane.

The oligocarbonates (I) may contain identical or different —Ar—residues, i.e. they may be based on mixtures of diphenols HO-Ar-OH (II).

Aliphatic dicarboxylic acids are preferably those containing 2 to 50 carbon atoms, more preferably those containing 3 to 20 carbon atoms and, most preferably, those containing 4 to 18 carbon atoms of which the alkylene groups may be linear or branched and which may contain ether and/or thioether bridges. The COOH substitutes of the dicarboxylic acids may be in the $\alpha,\beta$-,$\alpha,\gamma$- or $\alpha,\omega$-position. $\alpha,\omega$-Dicarboxylic acids are preferred.

Examples of dicarboxylic acids which may be used in accordance with the invention are oxalic acid, malonic acid, succinic acid, glutaric acid, adipic acid, sebacic acid, suberic acid, azelaic acid, dodecanedioic acid and dimeric fatty acid.

The alkylene groups of the aliphatic dicarboxylic acids may also contain arylene groups or cycloalkylene groups, preferred arylene groups being 1,4-phenylene or 1,3-phenylene groups and preferred cycloalkylene groups being 1,4-cyclohexylene groups.

Other dicarboxylic acids suitable for the purposes of the invention are cycloaliphatic dicarboxylic acids preferably containing 7 to 10 carbon atoms, such as for example 1,4-cyclohexane dicarboxylic acid.

Anhydrous neutral solvents suitable for use in accordance with the invention are chlorinated hydrocarbons, such as for example methylene chloride or chlorobenzene, aromatic hydrocarbons, such as toluene or mesitylene, or acetone and acetonitrile and mixtures of these solvents.

They are used in such quantities that the resulting reaction mixture contains 10 to 40% by weight oligocarbonate.

Catalysts suitable for use in accordance with the invention are, for example, tertiary aliphatic amines and nitrogen heterocycles, such as trimethyl amine, triethyl amine, tripropyl amine, tributyl amine, also pyridine, quinoline, isoquinoline, picoline, acridine, pyrazine, pyridazine, pyrimidine, oxazine, thiazine, benzimidazole or imidazole.

In addition to the free bases, the corresponding acid addition salts, for example trimethyl ammonium hydrochloride or pyridine hydrosulfate, may also be used.

The catalysts are used in quantities of 0.5 to 5% by weight, based on the oligocarbonate.

The process according to the invention preferably uses catalysts of which the boiling points in the free amine form are the same as or higher than the reaction temperature used. The preferred reaction temperature is between 100° C. and 200° C. Suitable chain terminators are, for example, phenol, $C_{1-10}$ alkylene phenols, such as p-tert.butyl phenol and p-isooctyl phenol, chlorophenols and bromophenols and monocarboxylic acids, such as benzoic acid, acetic acid and stearic acid.

Suitable branching agents are, for example, those mentioned in EP 480 237. Other suitable branching agents are tris- or tetracarboxylic acids.

The hydrochloric acid formed during the reaction and the carbon dioxide are removed from the reaction mixture in gaseous form.

The polycarbonates obtainable in accordance with the invention are isolated from the anhydrous organic solution in known manner by washing the solution until it is neutral and electrolyte-free, optionally after dilution with more organic solvent, and are then isolated as granules, for example using an evaporation extruder. Alternatively, the polycarbonates are precipitated and isolated from organic solution.

The polycarbonates obtainable by the process according to the invention have molecular weights $\overline{M}w$ (weight average, as determined by gel chromatography) of at least 9,000 to 190,000 and preferably in the range from 19,000 to 65,000.

They have a favorable property spectrum, i.e. good flow properties in conjunction with tough behavior.

The polycarbonates obtainable in accordance with the invention may readily be processed in conventional machines, for example extruders, injection molding machines etc., at temperatures of 250° to 350° C. and preferably at temperatures of 260° C. 300° C. to form molded articles of any kind, so that even complicated moldings can be produced with high dimensional accuracy. Precision moldings such as these are used, for example, in the electrical industry, but especially in aircraft construction and in the aerospace industry.

Additives typically used for aromatic polycarbonates, such as stabilizers, flow aids, plasticizers, mold release agents, fillers, reinforcing materials, such as glass fibers, glass beads, carbon fibers, kieselguhr, kaolin, crushed rock and pigments, may be incorporated in the polycarbonates obtainable in accordance with the invention in the usual way after their production, the processing described above to form the molded articles of any kind taking place either at the same time or thereafter.

Examples

The following oligomeric polycarbonates based on bisphenol A were used in the following Examples:

|  | I | II |
|---|---|---|
| $\eta_{rel}$: | 1.077 | 1.086 |
| $M_w$ | 3,500 | 4,030 |
| Phenolic OH: | 0.054–0.057% |  |
| Saponifiable chlorine: | 4.7% | 3.55% |

EXAMPLE 1

500g of the above oligomeric polycarbonate II, 36.6g adipic acid, 1540 g mesitylene and 7 ml tributyl amine were weighed into a 4 liter three-necked flask equipped with a stirrer, gas inlet and outlet and a reflux condenser. The contents of the flask were then heated with stirring to 160°–170° C. and stirred at that temperature for 8 hours. After cooling, the product was repeatedly washed with isopropanol and then dried. An aromatic-aliphatic polyester carbonate having a relative solution viscosity of 1.343 was obtained.

Example 2

500 g of the above oligomeric polycarbonate II, 36.6 g adipic acid, 1100 g chlorobenzene and 7 ml tributyl amine were weighed into a 4 liter three-necked flask equipped with a stirrer, gas inlet and outlet and a reflux condenser. The contents of the flask were then heated with stirring to approx. 130° C. and stirred at that temperature for 16 hours. After cooling, the product was repeatedly washed with isopropanol and then dried. An aromatic-aliphatic polyester carbonate having a relative solution viscosity of 1.419 was obtained.

Example 3

150 g of the above oligomeric polycarbonate I, 20.1 g dodecanedioic acid, 460 g mesitylene and 2.1 ml tributyl amine were weighed into a 1000 ml three-necked flask equipped with a stirrer, gas inlet and outlet and a reflux condenser. The contents of the flask were then heated with stirring to approx. 160° C. and stirred at that temperature for 8 hours. After cooling, the product was repeatedly washed with isopropanol and then dried. An aromatic-aliphatic polyester carbonate having a relative solution viscosity of 1.261 was obtained.

What is claimed is:

1. A process for producing an aliphatic-aromatic polycarbonate comprising
   (A) reacting at a temperature of 100° to 200° C. in an anhydrous neutral solvent
      (i) 10 to 40% of an oligocarbonate of diphenol with
      (ii) an aliphatic dicarboxylic acid, and
   (B) eliminating the hydrogen chloride and carbon dioxide by-products, characterized in that said oligocarbonate of diphenol is terminated by chlorocarbonic acid ester groups, said percent being relative to the weight of said solvent, oligocarbonate and acid.

2. The process of claim 1 wherein reaction is in the presence of a catalyst.

3. The process of claim 1 wherein said oligocarbonate of diphenol corresponds substantially to Cl—CO—(O—Ar—O—CO—)$_n$Cl wherein n is about 4 to 20 and —O—Ar—O— denotes a diphenolate residue containing 6 to 30 carbon atoms.

4. The process of claim 2 wherein catalyst is at least one member selected from the group consisting of tertiary amines and nitrogen heterocyclic compounds.

5. The process of claim 1 wherein aliphatic dicarboxylic acid contains 2 to 50 carbon atoms.

6. The process of claim 1 wherein aliphatic dicarboxylic acid contains 3 to 20 carbon atoms.

7. The process of claim 6 wherein said acid is adipic acid.

8. The process of claim 1 wherein said solvent is a chlorinated hydrocarbon.

9. A process for producing an aliphatic-aromatic polycarbonate comprising (A) reacting at a temperature of 100° to 200° C. in a chlorinated hydrocarbon solvent and in the presence of tributyl amine catalyst
  (i) 10 to 40% of an oligocarbonate of diphenol corresponding substantially to

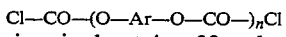
$$Cl-CO-(O-Ar-O-CO-)_nCl$$

wherein n is about 4 to 20 and —O—Ar—O— denotes a diphenolate residue of bisphenol-A with
  (ii) an aliphatic dicarboxylic acid selected from the group consisting of adipic acid and dodecanedioic acid, and
(B) eliminating the hydrogen chloride and carbon dioxide by-products, said percent being relative to the weight of said solvent, oligocarbonate and acid.

* * * * *